United States Patent
Xu et al.

(10) Patent No.: US 11,791,750 B2
(45) Date of Patent: Oct. 17, 2023

(54) POWER TOOL USING BRUSHLESS MOTOR AND METHOD FOR CONTROLLING THE SAME

(71) Applicant: Nanjing Chervon Industry Co., Ltd., Nanjing (CN)

(72) Inventors: Zhen Xu, Nanjing (CN); Junya Duan, Nanjing (CN); Jifeng Feng, Nanjing (CN)

(73) Assignee: Nanjing Chervon Industry Co., Ltd., Nanjing (CN)

( * ) Notice: Subject to any disclaimer, the term of this patent is extended or adjusted under 35 U.S.C. 154(b) by 0 days.

(21) Appl. No.: 17/560,520

(22) Filed: Dec. 23, 2021

(65) Prior Publication Data

US 2022/0115966 A1 Apr. 14, 2022

Related U.S. Application Data

(63) Continuation of application No. PCT/CN2020/105011, filed on Jul. 28, 2020.

(30) Foreign Application Priority Data

Jul. 30, 2019 (CN) .......................... 201910696822.0

(51) Int. Cl.
*H02P 1/02* (2006.01)
*H02P 6/17* (2016.01)
(Continued)

(52) U.S. Cl.
CPC ................ *H02P 1/029* (2013.01); *B25F 5/00* (2013.01); *H02P 6/17* (2016.02); *H02P 6/182* (2013.01)

(58) Field of Classification Search
CPC .. H02P 1/029; H02P 6/17; H02P 6/182; H02P 2203/03; H02P 6/20; H02P 6/24; B25F 5/00
(Continued)

(56) References Cited

U.S. PATENT DOCUMENTS 6,538,404 B2 * 3/2003 Kato ................. H02M 7/53871
  318/434
8,729,846 B2 * 5/2014 Nakata .................... H02P 21/22
  318/434
(Continued)

FOREIGN PATENT DOCUMENTS

CN 105356814 A 2/2016
CN 105580267 A 5/2016
(Continued)

OTHER PUBLICATIONS

EPO, extended European search report issued on European patent application No. 20846073.3, dated Oct. 7, 2022, 10 pages.
(Continued)

*Primary Examiner* — David Luo
(74) *Attorney, Agent, or Firm* — Greenberg Traurig, LLP (57) ABSTRACT

A power tool includes a housing, a brushless motor disposed inside the housing, and a controller. The controller is configured to receive power-off signals and power-on signals. Upon receiving a power-on signal, the controller is further configured to receive a time signal indicative of a time interval from the last power-off signal to the current power-on signal. The controller is further configured to determine whether the time interval is greater than or equal to a first time threshold and less than a second time threshold, and brake the motor before start-up if the time interval is greater than or equal to the first time threshold and less than the second time threshold.

17 Claims, 10 Drawing Sheets

(51) Int. Cl.
*B25F 5/00* (2006.01)
*H02P 6/182* (2016.01)

(58) Field of Classification Search
USPC .................................. 318/17, 34, 53, 59, 62
See application file for complete search history.

(56) References Cited

U.S. PATENT DOCUMENTS

| | | | |
|---|---|---|---|
| 9,621,081 B2 * | 4/2017 | Kawai | H02P 6/157 |
| 11,114,962 B2 * | 9/2021 | Narumi | H02P 6/182 |
| 2019/0036465 A1 | 1/2019 | Schock et al. | |

FOREIGN PATENT DOCUMENTS

| | | |
|---|---|---|
| CN | 106411187 A | 2/2017 |
| CN | 106911271 A | 6/2017 |
| CN | 106911671 A | 6/2017 |
| EP | 2433757 A2 | 3/2012 |
| JP | 2006115641 A | 4/2006 |
| JP | 2010045941 A | 2/2010 |
| JP | 2012050284 A | 3/2012 |

OTHER PUBLICATIONS

ISA/CN, International Search Report issued on PCT application No. PCT/CN2020/105011, dated Nov. 3, 2020, 4 pages.

ISA/CN, English translation of International Search Report issued on PCT application No. PCT/CN2020/105011, dated Nov. 3, 2020, 4 pages.

ISA/CN, Written Opinion issued on PCT application No. PCT/CN2020/105011, dated Nov. 3, 2020, 3 pages.

ISA/CN, English translation of Written Opinion issued on PCT application No. PCT/CN2020/105011, dated Nov. 3, 2020, 4 pages.

\* cited by examiner

POWER TOOL USING BRUSHLESS MOTOR AND METHOD FOR CONTROLLING THE SAME

RELATED APPLICATION INFORMATION

The present application claims the benefit of Chinese Patent Application No. 201910696822.0, filed on Jul. 30, 2019, which application is incorporated herein by reference in its entirety.

TECHNICAL FIELD

This disclosure relates to power tools, and in particular to power tools with brushless motor systems.

BACKGROUND

Many power tools choose brushless motor over brushed motor because motors without brushes can provide the advantages of high reliability, low mechanical noise, and no commutation spark, etc. Further, brushless motors without a sensor can be lower in cost, smaller in dimension, lighter in weight, less complicated, and less prone to failure.

Brushless motor control, without sensors, uses back electromotive force (back-EMF, BEMF) for determining the position of the rotor with respect to the stator. A voltage applied across a winding of the motor forces the rotor to turn. The movement of the rotor through the magnetic field of the motor, however, is analogous to the behavior of a generator, and consequently the motor not only receives an applied voltage but also generates its own voltage. This voltage is referred to as back electromotive force, and it is proportional to the rotational speed of the motor.

Therefore, when the rotor of a brushless motor is rotating fast, the back-EMF zero-crossing method detects the position of the rotor perfectly. However, this is not the case when the rotor is rotating slowly or coasting to stop. A delay in restarting the tool happens when the back-EMF zero-crossing detection is not accurate and the position of the rotor cannot be effectively determined. This issue becomes especially annoying when the user frequently turns on and off the power tool. The user can feel a significant delay, e.g., nearly 1 second, when restarting a power tool whose motor has not stopped rotating.

SUMMARY

According to an example, a power tool is provided and includes a housing, a brushless motor disposed inside the housing, a power supply device configured to supply power to the brushless motor, a power switch circuit disposed between the power supply device and the brushless motor, and a controller. The controller includes a switch signal detection module configured to detect power-on signals and power-off signals, and a timing module configured to measure a time interval from the detection of the last power-off signal to the detection of the current power-on signal. The controller is configured to control a switching operation of the power switch circuit to regulate power being supplied from the power supply device to the brushless motor; upon the detection of a power-on signal, the controller is further configured to receive a time signal indicative of the time interval from the detection of the last power-off signal to the detection of the current power-on signal from the timing module, determine whether the time interval is greater than or equal to a first time threshold and less than a second time threshold, and brake the brushless motor before start-up if the time interval is greater than or equal to the first time threshold and less than the second time threshold.

According to an example, a power tool is provided and includes a housing, an electric motor disposed inside the housing, and a controller. The controller is configured to receive power-off signals and power-on signals, and upon receiving a power-on signal, receive a time signal indicative of a time interval from a last power-off signal to a current power-on signal. The controller is further configured to determine whether the time interval is greater than or equal to a first time threshold and less than a second time threshold, and brake the electric motor before start-up if the time interval is greater than or equal to the first time threshold and less than the second time threshold.

According to an example, a power tool is provided and includes a housing, a brushless motor disposed inside the housing, a power supply device configured to supply power to the brushless motor, a power switch circuit disposed between the power supply device and the brushless motor, and a controller. The controller includes a switch signal detection module configured to detect power-on signals and power-off signals, and a motor speed detection module configured to detect a rotational speed of the motor. The controller is configured to control a switching operation of the power switch circuit to regulate power being supplied from the power supply device to the brushless motor. Upon the detection of the power-on signal, the controller is further configured to receive a speed signal indicative of the rotational speed of the brushless motor from the motor speed detection module, determine whether the motor rotational speed is greater than zero and less than or equal to a predetermined speed threshold, and brake the brushless motor before start-up if the motor rotational speed is greater than zero and less than or equal to the predetermined speed threshold.

According to an example, a power tool is provided and includes a housing, an electric motor disposed inside the housing, and a controller. The controller is configured to receive power-off signals and power-on signals, and upon receiving a power-on signal, receive a speed signal indicative of a rotational speed of the electric motor. The controller is further configured to determine whether the motor rotational speed is greater than zero and less than or equal to a predetermined speed threshold, and brake the electric motor before start-up if the motor rotational speed is greater than zero and less than or equal to the predetermined speed threshold.

According to an example, a method for controlling a power tool with a motor is provided. The method includes: detecting a power-off signal and a power-on signal; measuring a time interval from the detection of the last power-off signal to the detection of the current power-on signal upon the detection of the power-on signal; determining whether the time interval is greater than or equal to a first time threshold and less than a second time threshold; and braking the motor before start-up if the time interval is greater than or equal to the first time threshold and less than the second time threshold.

According to an example, a method for controlling a power tool with a brushless motor is provided. The method includes: detecting a power-on signal; measuring a rotational speed of the brushless motor upon the detection of the power-on signal; determining whether the rotational speed of the brushless motor is greater than zero and less than or equal to the predetermined speed threshold; and braking the brushless motor before start-up if the rotational speed of the brushless motor is greater than zero and less than or equal to the predetermined speed threshold.

According to an example, a power tool is provided and includes a housing, a brushless disposed inside the housing, a power supply device configured to supply power to the brushless motor, and a controller. The controller includes a switch signal detection module configured to detect power-on signals and power-off signals; a timing module configured to measure a time interval from a detection of a last power-off signal to a detection of a current power-on signal; and a motor speed detection module configured to detect a rotational speed of the brushless motor. The controller is configured to control a switching operation of the power switch circuit to regulate power being supplied from the power supply device to the motor. The controller is further configured to upon the detection of a power-on signal, receive a time signal indicative of the time interval from the detection of the last power-off signal to the detection of the current power-on signal from the timing module, and a speed signal indicative of the rotational speed of the motor from the motor speed detection module, determine whether the time interval is greater than or equal to a first time threshold and less than a second time threshold, or whether the motor rotational speed is greater than zero and less than or equal to a speed threshold, and brake the brushless motor before start-up if the time interval is greater than or equal to the first time threshold and less than the second time threshold, or if the motor rotational speed is greater than zero and less than or equal to the speed threshold.

According to an example, a power tool is provided and includes a housing, an electric motor disposed inside the housing, and a controller. The controller is configured to receive power-off signals and power-on signals, and upon receiving a power-on signal, receive a time signal indicative of a time interval from the last power-off signal to the current power-on signal and a speed signal indicative of a motor rotational speed. The controller is further configured to determine whether the time interval is greater than or equal to a first time threshold and less than a second time threshold, or whether the motor rotational speed is greater than zero and less than or equal to a speed threshold, and brake the motor before start-up if the time interval is greater than or equal to the first time threshold and less than the second time threshold, or if the motor rotational speed is greater than zero and less than or equal to the speed threshold.

According to an example, a method for controlling a power tool with a brushless motor is provided. The method includes detecting a power-off signal and a power-on signal, measuring a time interval from a detection of a last power-off signal to a detection of a current power-on signal and a rotational speed of the brushless motor upon the detection of the power-on signal, determining whether the time interval is greater than or equal to a first time threshold and less than a second time threshold, or whether the motor rotational speed is greater than zero and less than or equal to a speed threshold; and braking the brushless motor before start-up if the time interval is greater than or equal to the first time threshold and less than the second time threshold, or if the motor rotational speed is greater than zero and less than or equal to the speed threshold.

BRIEF DESCRIPTION OF THE DRAWINGS

The drawings described herein are for illustration purposes only and are not intended to limit the scope of this disclosure in any way.

DETAILED DESCRIPTION

The following description illustrates examples of a power tool using a brushless motor and method for controlling the same which examples are not intended to be limiting. The description clearly enables one skilled in the art to make and use the several examples, as well as adaptations, variations, alternatives, and uses of the several examples. Additionally, it is to be understood that the disclosure is not limited in its application to the details of construction and the arrangements of components set forth in the following description or illustrated in the drawings. The disclosure is capable of other examples and of being practiced or being carried out in various ways. Also, it is to be understood that the phraseology and terminology used herein is for the purpose of description and should not be regarded as limiting.

Figure 1:
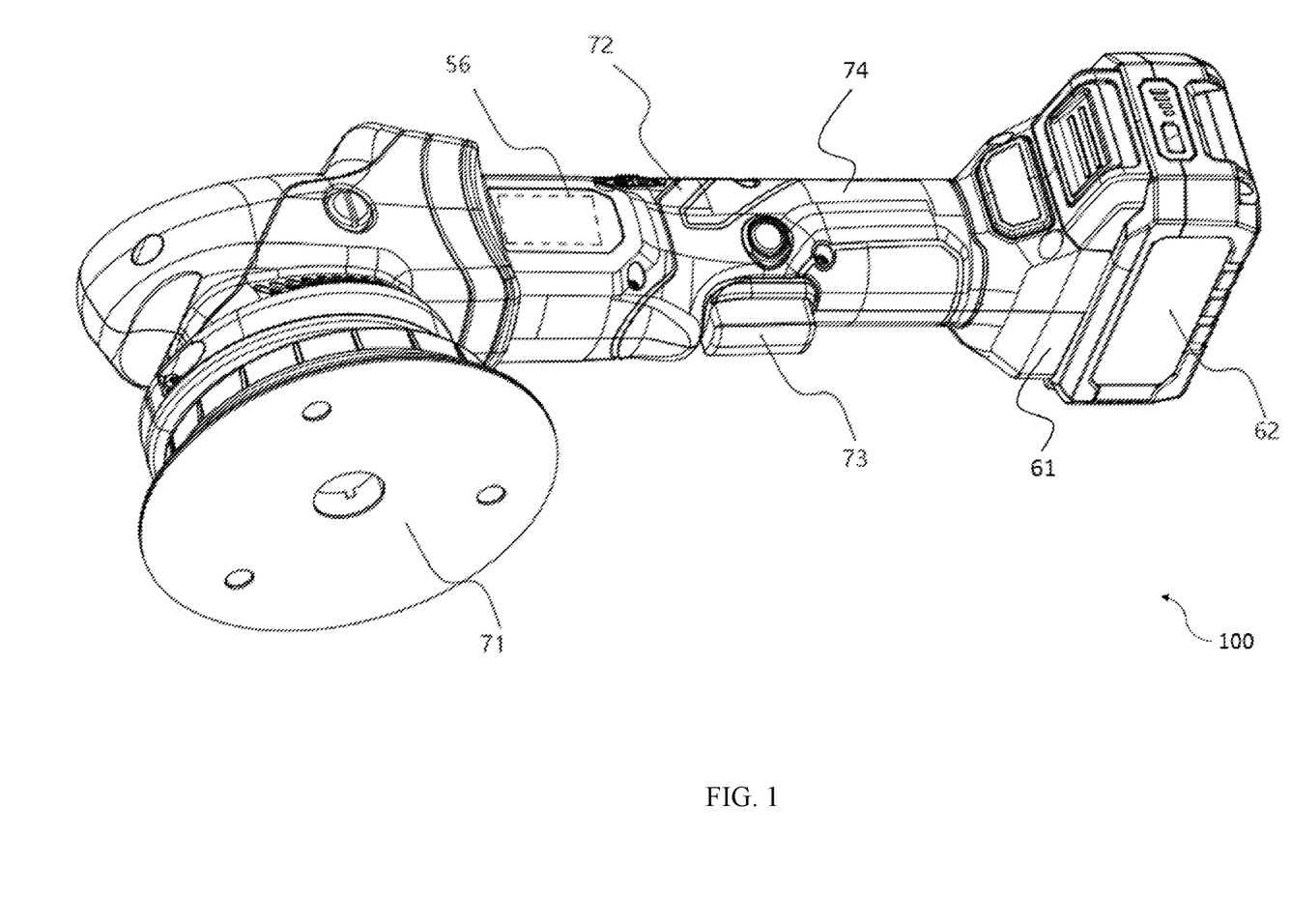
FIG. 1 is a perspective view of an exemplary power tool according to an example of the present application.

As shown in FIG. 1, according to an example, a power tool is provided including a housing 72, a functional element 71, a motor 56, a trigger assembly 73, a power receiver 61, and a power supply device 62. The power tool as shown herein is a polisher 100. For the polisher 100, the functional element 71 is an abrasive disc arranged to be coupled to a spindle (not shown). The abrasive disc may adhere to a self-adhering plate that is fixedly connected to the spindle. The motor 56 is configured to drive the spindle to rotate. Housed inside the housing 72, the motor 56 may directly drive the spindle, or indirectly drive the spindle through a transmission mechanism. The housing 72 forms a handle portion 74 on the rear side of the motor 56. The handle portion 74 accommodates the trigger assembly 73 (also referred to as an actuator). The trigger assembly 73 is operatively connected to a control circuit for controlling the operation of the motor 56. The trigger assembly 73 may include an on/off trigger or a variable-speed actuator. The power receiver 61 extends from the rear end of the handle portion 74 for detachable engagement with the power supply device 62 to provide power to the power tool. The power supply device 62 may be a battery pack or some AC power supply. It should be understood, however, that the teachings of this disclosure may apply to any other power tool including, but not limited to, an electric router, an angle grinder, a reciprocating saw, a drill, a sander, and the like.

Figure 2:
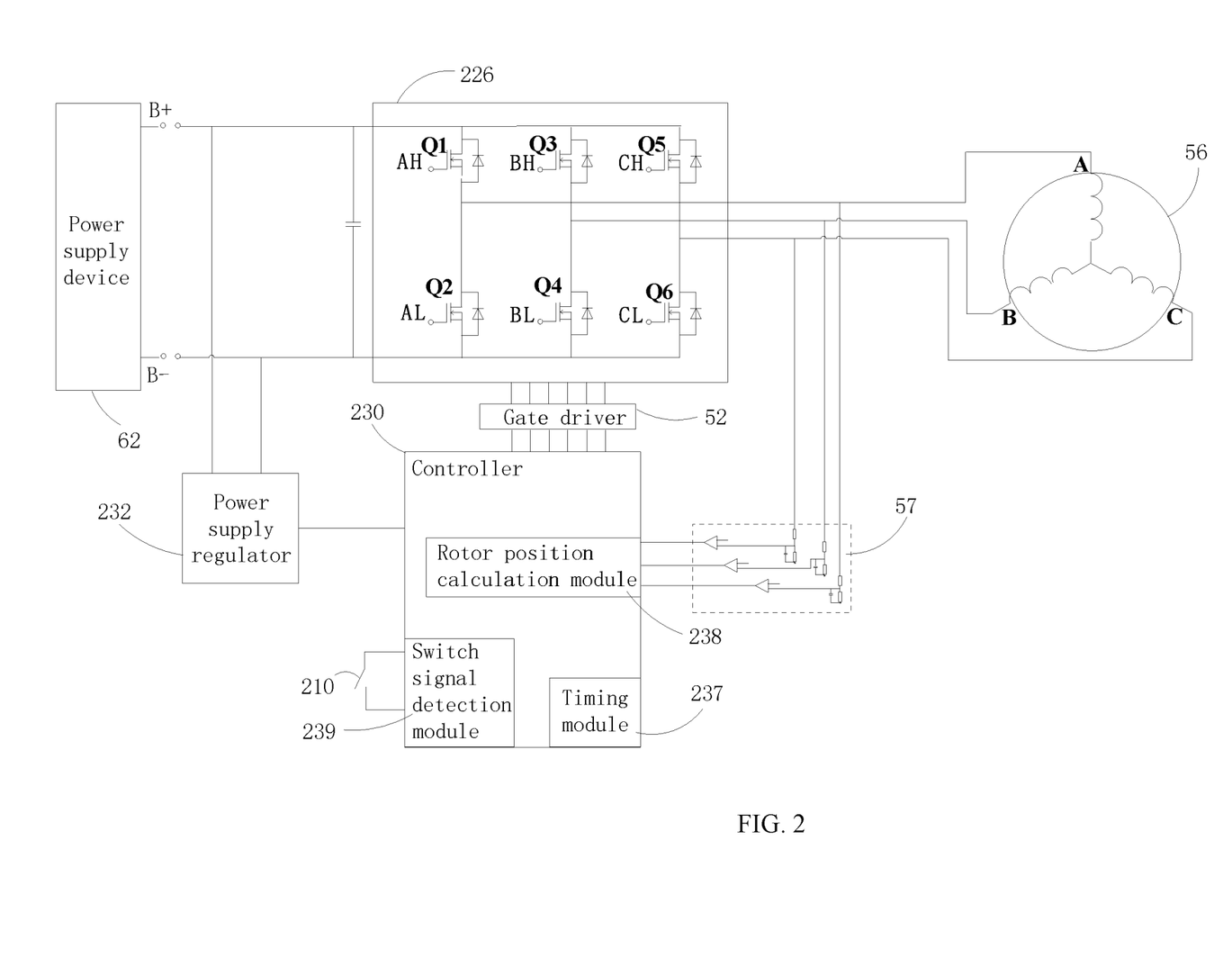
FIG. 2 is an exemplary circuit block diagram of a power tool according to an example of the present application.
Figure 3:
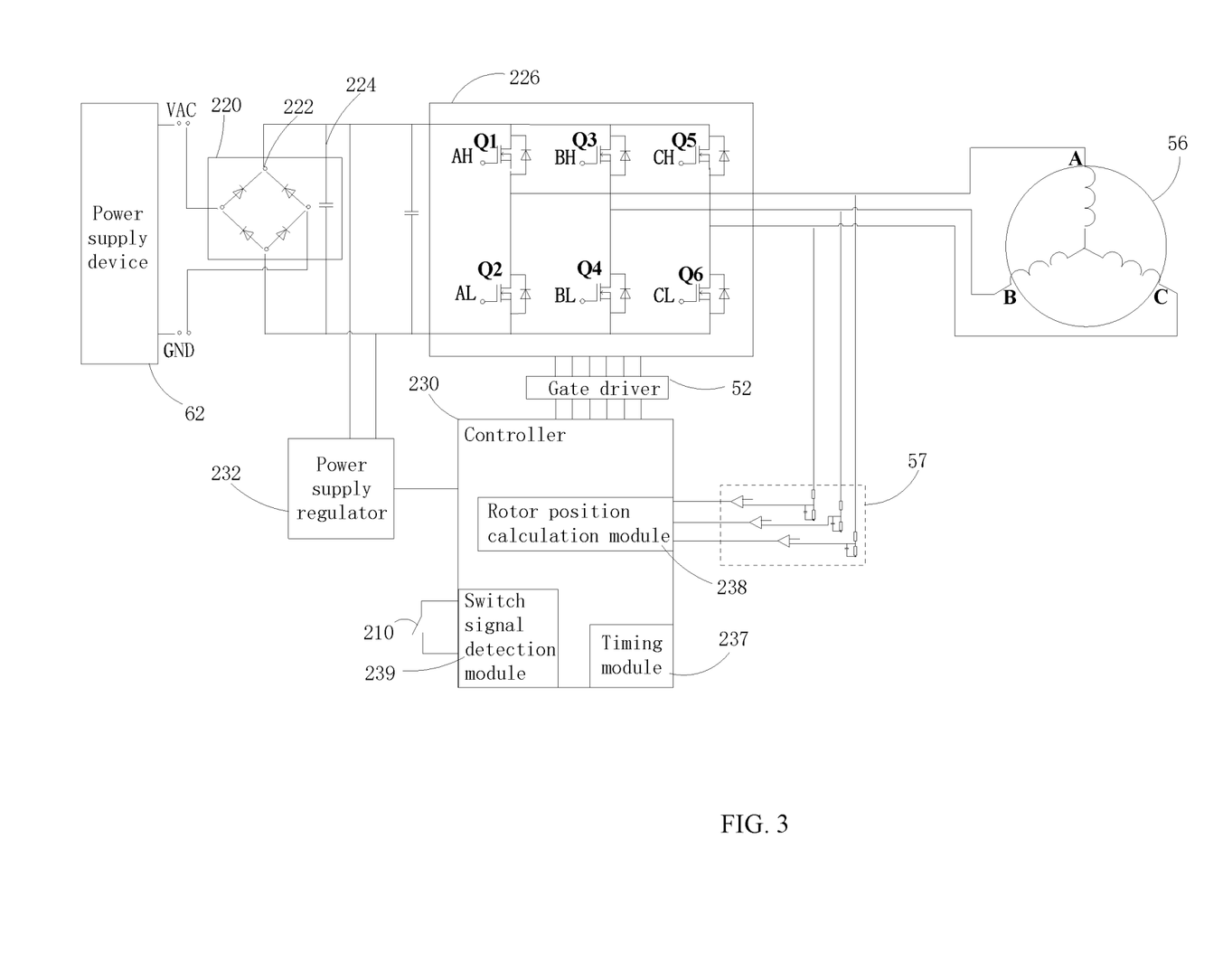
FIG. 3 is an exemplary circuit block diagram of a power tool according to another example of the present application.

Referring to FIG. 2, a circuit block diagram of a power tool including a motor 56 is depicted, according to an example. The power tool receives power from the power supply device 62 such as a battery pack via B+ and B− terminals. It is noted, however, that the power supply device 62 may alternatively be an AC power supply device. FIG. 3 depicts a block circuit diagram of a power tool that receives power from an AC power supply device such as, for example, an AC power generator or the power grid. In an example, a rectifier circuit 220 is provided between the power supply device and the power switch circuit. In an example, power from the AC power lines as designated by VAC and GND is passed through the rectifier circuit 220 to convert or remove the negative half-cycles of the AC power. In an example, the rectifier circuit 220 may include a full-wave bridge diode rectifier 222 to convert the negative half-cycles of the AC power to positive half-cycles. Alternatively, in an example, the rectifier circuit 220 may include a half-wave rectifier to eliminate the half-cycles of the AC power. In an example, the rectifier circuit 220 may further include a bus capacitor 224.

Referring back to FIG. 2, the motor 56 may be further defined as a sensorless brushless motor. The sensorless brushless motor may be a three-phase permanent magnet synchronous motor including a rotor having permanent magnets and a wound stator that is commutated electronically as described below. The stator windings are designated herein as A, B, and C windings corresponding to the three phases of the motor 56. It must also be understood that the sensorless brushless motor 56 may include fewer than or more than three phases. As suggested by the name, the sensorless brushless motor 56 is not equipped with position sensors like Hall-effect sensors; instead, the rotational position of the rotor is detected by sensorless means such as the back-EMF approach. While many of the concepts presented herein are particularly applicable to BLDC motors, some of the concepts can be applied to other types of motors as well.

A power switch circuit 226 is arranged between the power source terminals and motor windings to drive the sensorless brushless motor 56. In the example, the power switch circuit may be further defined as a three-phase inverter bridge as shown in FIG. 2. The three-phase bridge circuit includes three high-side switches Q1, Q3, Q5 (semiconductor power devices such as FETs, BJTs, IGBTs, etc.) and three low-side switches Q2, Q4, Q6 (semiconductor power devices such as FETs, BJTs, IGBTs, etc.). In an example, the gates of the high-side FETs are driven via signals AH, BH, and CH, and the gates of the low-side FETs are driven via motor control signals AL, BL, and CL. In an example, the sources of the high-side FETs are coupled to the drains of the low-side FETs to output power signals PA, PB, and PC to drive the motor 56. Other switching arrangements are also contemplated by this disclosure.

In an example, the control circuit may include a gate driver 232, a power supply regulator 234, a signal switch 210 and a controller 230 including a switch signal detection module 236, a timing module 237, and a rotor position calculation module 238. In an example, the power supply regulator 234 includes one or more voltage regulators to step down the power supply to a voltage level compatible for operating the electronic components in the control circuit such as the gate driver 232 and the controller 230. In an example, the power supply regulator 234 may include a buck converter and/or a linear regulator to reduce the power voltage across the power supply. In an example, the power supply regulator 234 supplies different voltages to different electronic components through different wires respectively.

Figure 4:
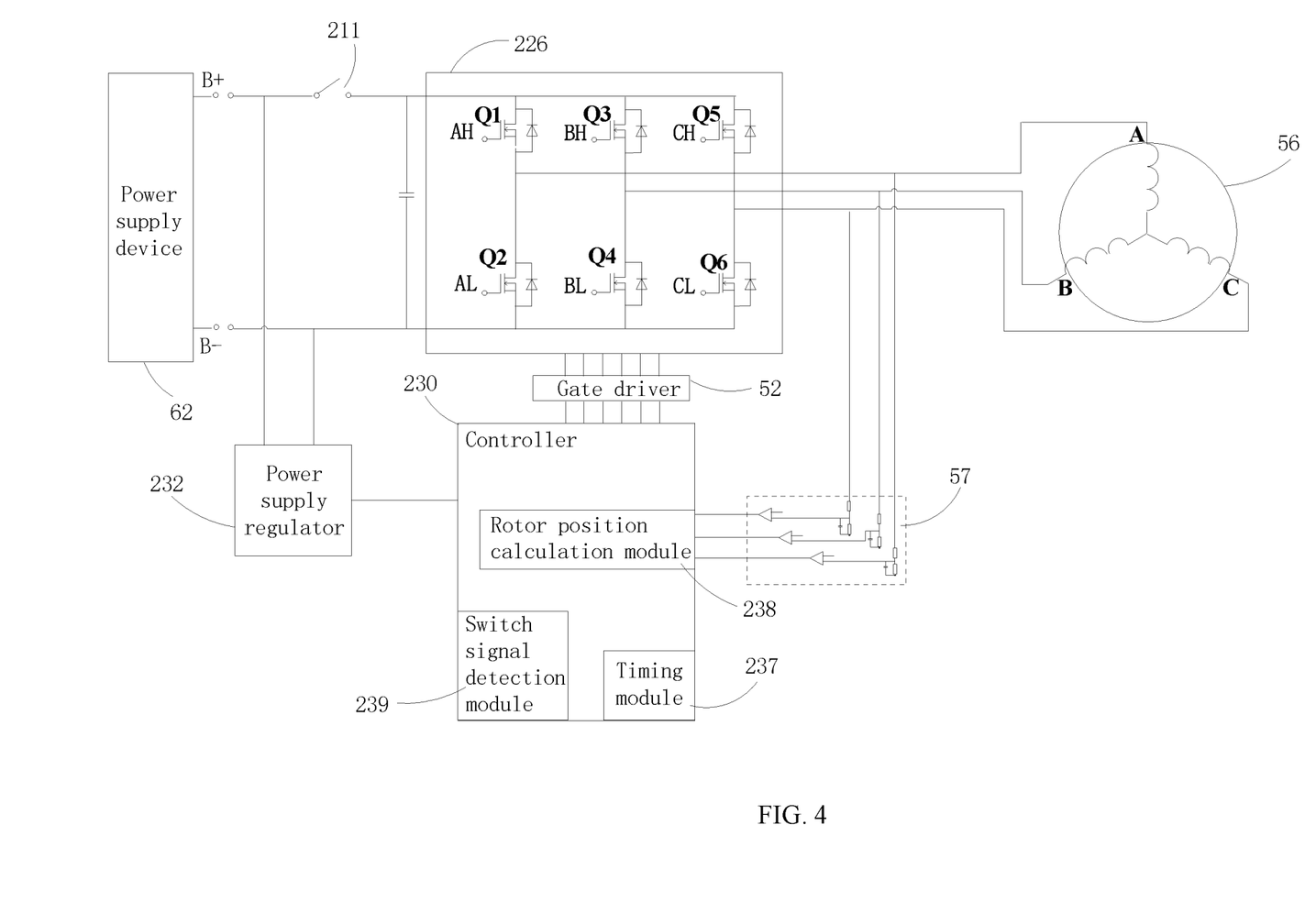
FIG. 4 is an exemplary circuit block diagram of a power tool according to another example of the present application.

The signal switch 210 may be coupled to the on/off trigger or the variable-speed actuator of the trigger assembly 73 to allow the user to start and stop the motor 56. For example, when the user presses the on/off trigger, a power-on signal is sent from the signal switch 210; when the user releases the on/off trigger, a power-off signal is sent from the signal switch 210. The power-on signal and the power-off signal in this closure refers to the signal to start and stop the motor driving the functional element; signals to connect or cut the power supply to the power tool also applies to the motor, but signals relating to auxiliary functions such as turning on and off a lighting device are irrelevant. It is noted that the switch may be provided with a different type at a different location. In an alternative example, a high current switch 211 is provided between the power source terminal and the power switch circuit 226. As shown in FIG. 4, the high current switch 211 connects or disconnects the power supply to the power tool. In addition, because of the various switching mechanisms such as brake, safety lock, and lock on/off mechanisms of power tools, more than one switch may send signals to the switch signal detection module 236 and the switch signal detection module 236 is configured to logically compute the superposed signal from a combination of more than one switch. For example, an emergency brake of a chain saw causes a power-off signal regardless of the state of the on/off trigger switch; a safety lock of a hedge trimmer enables or disables the power-on signal from the on/off trigger switch. In an example, the power-off signal is not limited to being the result of a user operation, the controller itself may also generate power-off signals under failure conditions such as over-temperature, over-current, etc.

In an example, the signal switch 210 is connected to the switch signal detection module 236. The switch signal detection module 236 is configured to detect power-on signals and power-off signals from the signal switch 210 or the high current switch 211, or a combination of switches as described above. The power-on signal and the power-off signal may be in the form of high/low electrical level or A/D conversion interval value. For example, in the electrical level detection method, 0 represents a power-off signal, and 1 represents a power-on signal; in the A/D conversion detection method, an A/D conversion value less than 50 represents a power-off signal, and an A/D conversion value greater than 100 represents a power-on signal. In an example, the timing module 237 is activated with a power-off signal and a power-on signal. Upon receiving a power-on signal, the timing module 237 calculates the time interval from the detection of the last power-off signal to the detection of the current power-on signal and sends the time interval information to the controller 230.

In an example, the controller 230 is a programmable device arranged to control a switching operation of the semiconductor power devices in power switching circuit 226. In one example, the controller is implemented by a microcontroller. The controller may also refer to an electronic circuit, an application specific integrated circuit (ASIC), a processor (shared, dedicated, or group) and/or memory (shared, dedicated, or group) that execute one or more software or firmware programs, a combinational logic circuit, and/or other suitable components that provide the described functionality. The controller 230 receives power-on signals and power-off signals by the switch signal detection module 236. The controller 230 also receives time signals from the timing module 237 indicative of the time interval from the detection of the last power-off signal to the detection of the current power-on signal. Based on the switch signal and the time signal, the controller 230 is able to make various operational decisions such as whether to start or stop, whether to speed up or slow down, and whether to brake the motor before start up the power tool. In an example, the rotor position calculation module 238 of the controller 230 is coupled to a back-EMF detection circuit 57 in order to calculate the rotational position of the rotor. Based on the operational decisions and the rotor position information, the controller 230 outputs drive signals AH, BH, CH, AL, BL, and CL through the gate driver 232, which provides a voltage level needed to drive the gates of the semiconductor switches within the power switch circuit 226 in order to control a switching operation of the power switch circuit 226.

A back-EMF zero-crossing event is located midway between the switching events and are the points at which the non-energized phase transitions either from the negative voltage through the neutral point toward the positive voltage, or from the positive voltage through the neutral point toward ground, depending of the direction. The back-EMF detection circuit 57 detects the back-EMF zero-crossing events, and as shown in FIG. 2, the back-EMF detection circuit 57 includes resistor divider networks and comparators. Each resistor divider network divides sensed voltages down to a voltage level allowable by the controller, for example, 0-15V. Each comparator compares the input signals from the bus line against the input signals from the phase. The phase zero-crossing event can be detected at the moment when the branch voltage of a non-energized phase crosses the half DC-bus voltage level. Because the back-EMF generated is proportional to the rotational speed of the motor, when the motor 56 is at a standstill or at a low speed, the back-EMF zero-crossing event cannot be accurately detected and the rotational position of the rotor cannot be correctly determined. On the other hand, when the motor 56 is at a standstill, there exist other methods, such as injecting a sequence of voltage pulses to the stator windings, to accurately estimate the initial rotational position of the rotor.

Based on these observations, if the user restart the power tool not long after cutting off the power supply to the power tool or braking the power tool, and the motor 56 is rotating slowly at the moment, for example, coasting to a stop, the controller 230 can brake the motor 56 to stop the motor 56 faster and then apply the technologies to estimate the rotational position of the rotor when the motor 56 is at a standstill, saving the time for the motor 56 to freely rotate with inertia and thereby start up more quickly. The brake operation may be a short circuit brake by simultaneously activating the plurality of low-side switches or the plurality of high-side switches to stop the rotation of the motor 56. However, if the time interval between the stop signal and the restart signal is very short, it is possible that the motor 56 has not decelerated enough, and the back-EMF detection may still be accurate. In this case the controller 230 should not brake the motor 56 as the controller 230 can start the motor 56 directly using the rotor position calculated from the back-EMF information detected by the back-EMF detection circuit 57, saving the time for the motor 56 to accelerate after a brake. It is also understood that, if the time interval between the stop signal and the restart signal is long enough to allow the motor 56 to be fully stopped, a brake is also redundant.

Figure 5:
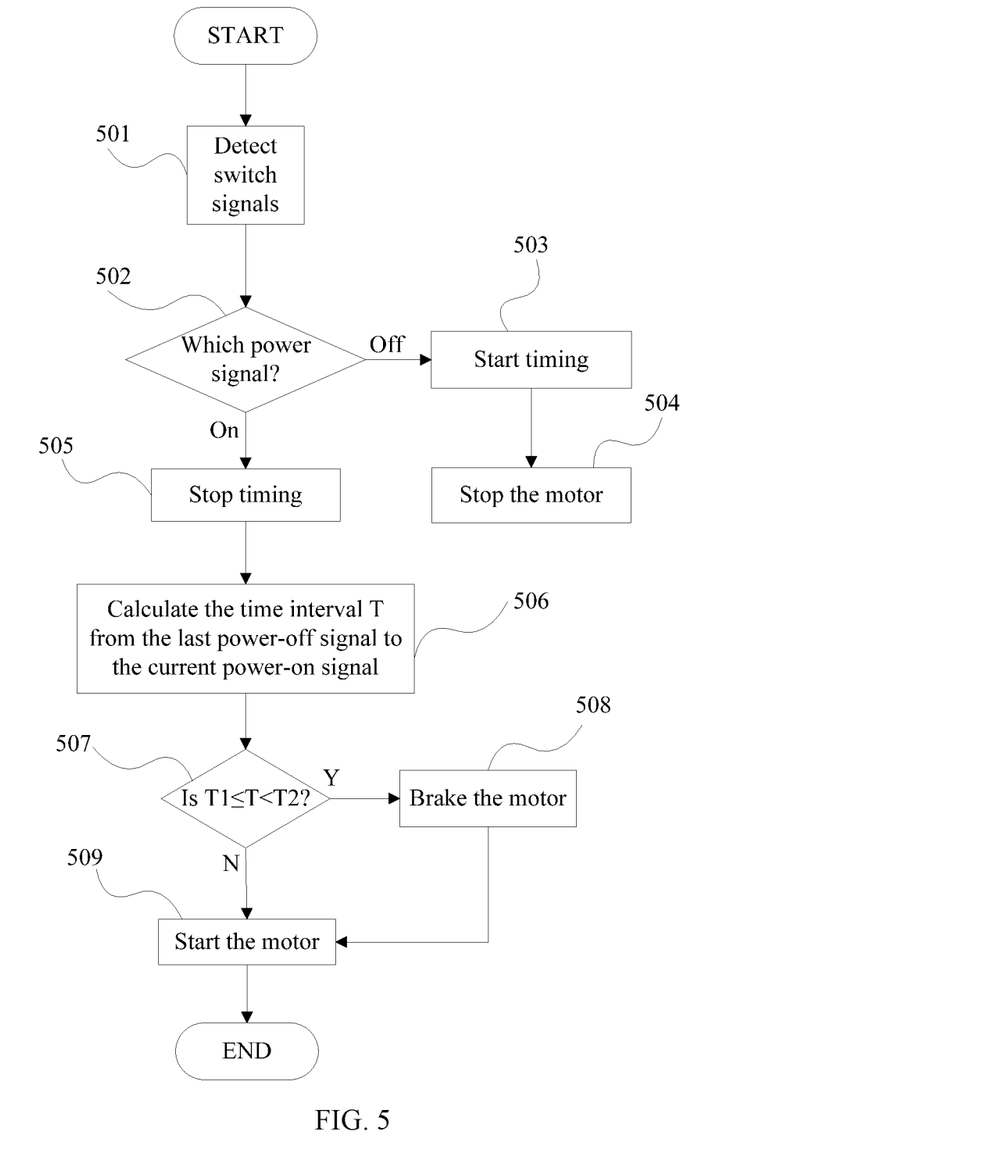
FIG. 5 is a flowchart of a control method for controlling a power tool according to an example of the present application.

With reference to FIG. 5, an exemplary control flow according to an example is provided. At 501, the switch signal detection module 236 detects signals from the signal switch or the high current switch. At 502, if the detected signal is a power-off signal, the timing module 237 starts timing at 503 and the controller 230 cuts power supply to the motor 56 at 504; if the detected signal is a power-on signal, the timing module 237 stops timing at 505 and calculates time interval T from the detection of the last power-off signal to the detection of the current power-on signal at 506. The timing module 237 may be a stopwatch that starts and stops to measure a time interval, in which case a calculation might not be involved. Alternatively, the timestamps of a power-off signal and a power-on signal may be recorded in the memory to calculate the time interval, in which case there may be no actual events like start timing and stop timing. The specific implementation of the timing module 237, which may or may not be integrated in the controller 230, is not limited herein, as long as the time interval T from the detection of the last power-off signal to the detection of the current power-on signal is derivable. The controller 230 then compares the time interval T to a predetermined first time threshold T1 and a predetermined second time threshold T2 at 507, if the time interval T is greater than or equal to the first time threshold T1 and less than the second time threshold T2, the controller 230 executes a brake such as a short circuit brake by simultaneously activating the plurality of low-side switches or the plurality of high-side switches to quickly stop the rotation of the motor 56 at 508, which is followed by starting the motor 56 at 509; if the time interval T is less than the first time threshold T1 or greater than or equal to the second time threshold T2, the controller 230 directly starts the motor 56 at 509 without executing a brake.

Figure 6:
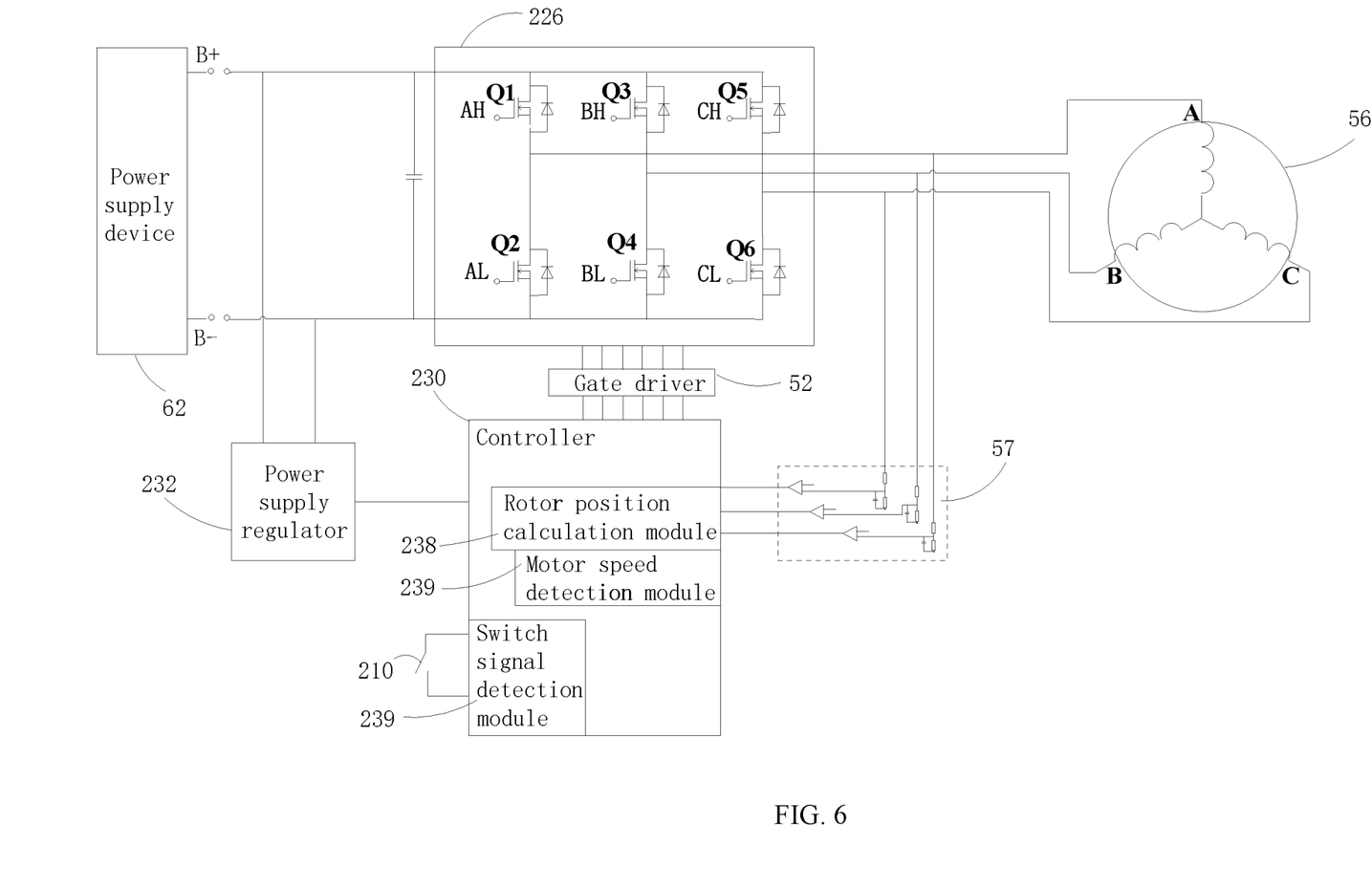
FIG. 6 is an exemplary circuit block diagram of a power tool according to another example of the present application.
Figure 7:
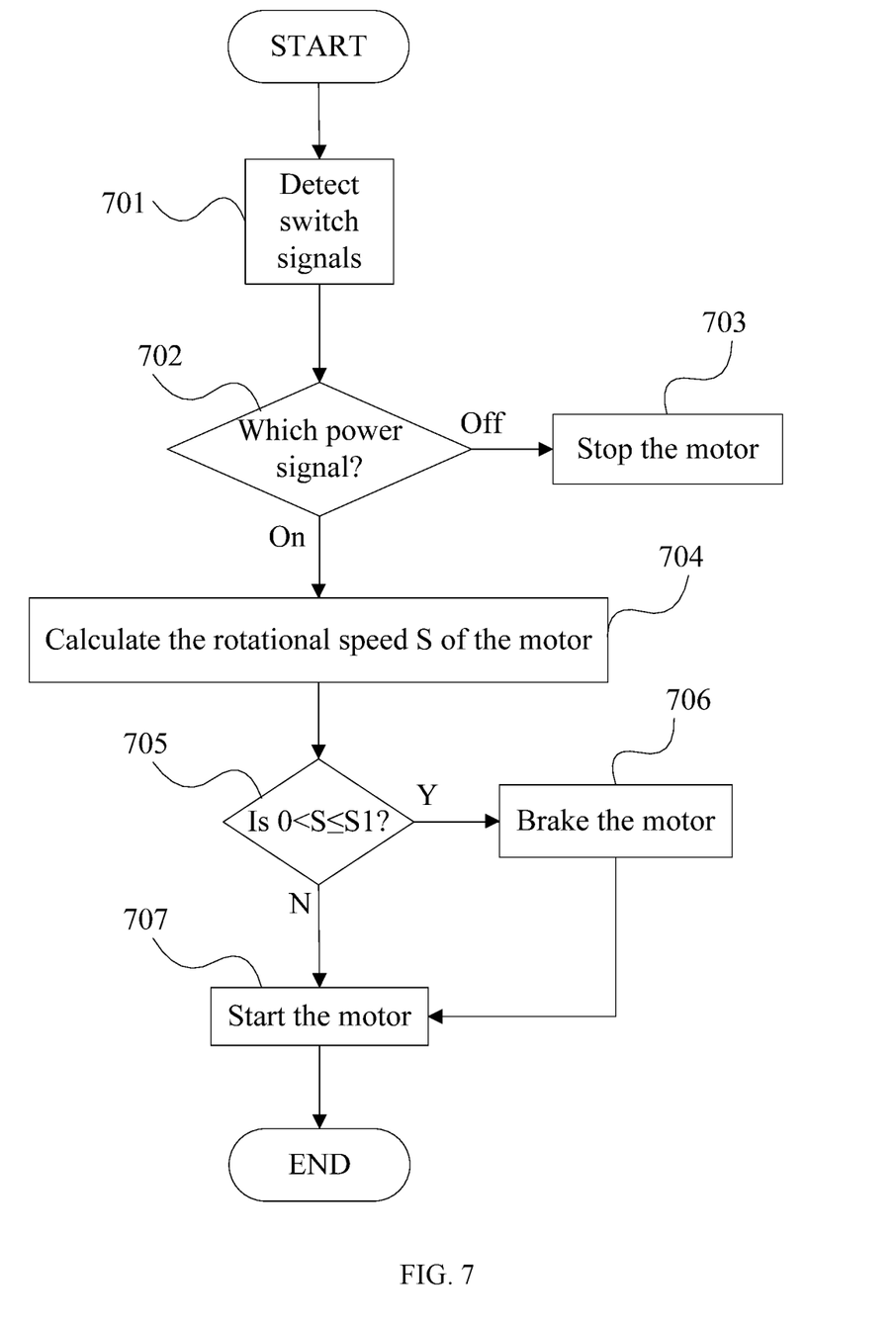
FIG. 7 is a flowchart of another control method for controlling a power tool according to another example of the present application.

In another example, motor rotational speed replaces time interval to be the input for the controller 230 to decide whether to brake the motor 56 before starting the motor 56. The circuit block diagram of a power tool according to this example is shown in FIG. 6, and the flow chart of the control method according to this example is shown in FIG. 7. In this example, the timing module 237 in the control circuit in FIG. 2 may be removed unless otherwise used, and a motor speed detection module 239 may be added to the controller 230, as shown in FIG. 6. In an example, the motor speed detection module 239 calculates the rotational speed of the motor with the back-EMF readings from the back-EMF detection circuit 57. The back EMF is directly proportional to the rotational speed of the motor, and a motor voltage constant. The motor voltage constant includes parameters like magnetic field strength which are also constant. The specific implementation of the motor speed detection module 239, which may or may not be integrated in the controller 230, is not limited herein, as long as the rotational speed of the motor is derivable.

With reference to FIG. 7, at 701, the switch signal detection module 236 detects signals from the signal switch or the high current switch. At 702, if the detected signal is a power-off signal, the controller 230 cuts power supply to the motor 56 at 703; if the detected signal is a power-on signal, the motor speed detection module 239 calculates the real time rotational speed S of the motor 56 at 704. The controller 230 then compares the real time rotational speed S of the motor 56 to a predetermined speed threshold S1 at 705, if the real time rotational speed S of the motor 56 is greater than zero and less than or equal to the speed threshold S1, the controller 230 executes a brake such as a short circuit brake by simultaneously activating the plurality of low-side switches or the plurality of high-side switches to quickly stop the rotation of the motor 56 at 707; if the real time rotational speed S of the motor 56 is zero or greater than the predetermined speed threshold S1, the controller 230 directly starts the motor 56 at 707 without executing a brake.

Figure 8:
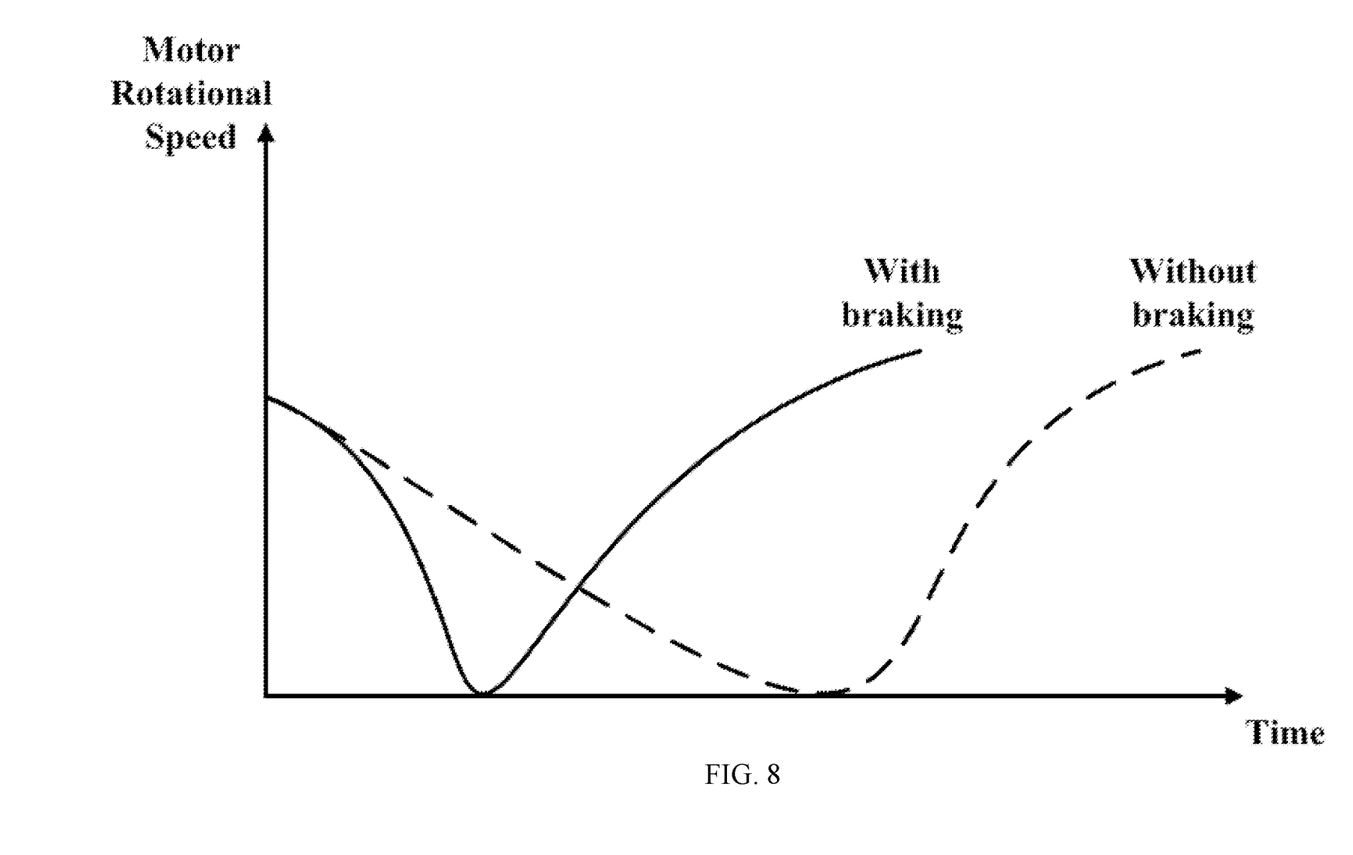
FIG. 8 is a waveform diagram illustrating the result from applying the control method of a power tool according to an example of the present application.

FIG. 8 is an illustrative waveform diagram for comparing the stop and restart process of a power tool with and without performing a brake operation before start-up, assuming that the real time rotational speed of the motor upon the detection of the power-off signal is less than the predetermined speed threshold. The solid line shows the varying rotational speed of the motor with respect to time when the controller brakes the motor before restarting the motor; the dashed line shows the varying rotational speed of the motor with respect to time when the controller does not brake the motor before restarting the motor. Without a brake, the motor freely coasts to stop, determines the rotor position at zero speed and then starts up, causing a restart delay. Executing a brake allows the motor to stop more quickly than following the rotational inertia to stop, and determine the rotor position at zero speed earlier, thereby allowing the startup acceleration process to come earlier. In experimentation, the restart delay is shortened by about 400 ms when a brake operation is performed before restarting the motor. Especially for power tools that frequently start and stop in some operation scenarios, such as a polisher, an electric router, an angle grinder, a reciprocating saw, a drill, or a sander, with the presented control method, the restart delay is minimized and the whole restart process is significantly quicker, which greatly improves user experience. It is noted that the brake operation is not limited to a short circuit break, other methods that stop the motor quickly in order to apply techniques to determine the rotor position at zero speed and then restart the motor also fall in the range of the present disclosure.

Figure 9:
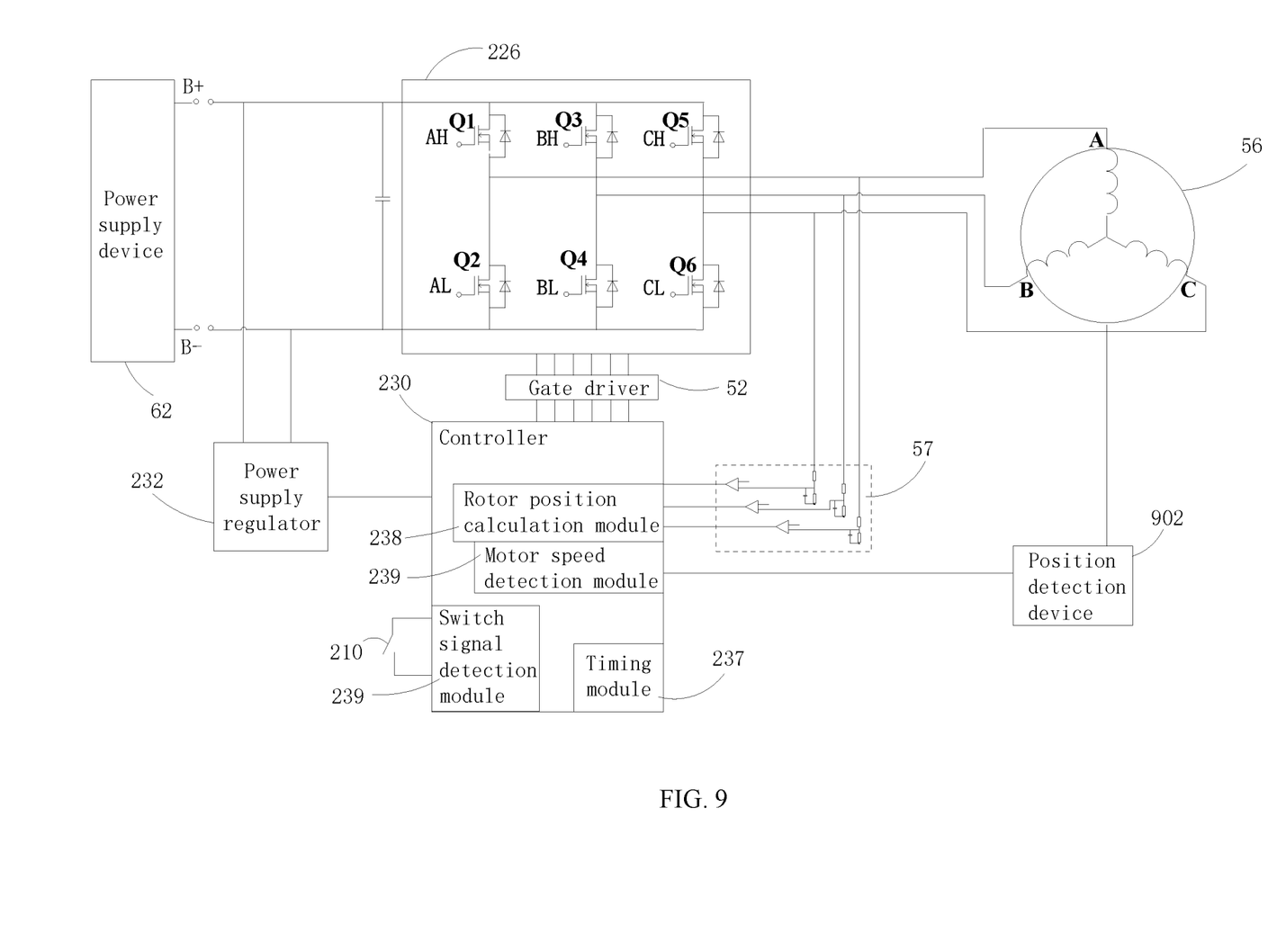
FIG. 9 is an exemplary circuit block diagram for finding threshold values of a power tool according to an example of the present application.
Figure 10:
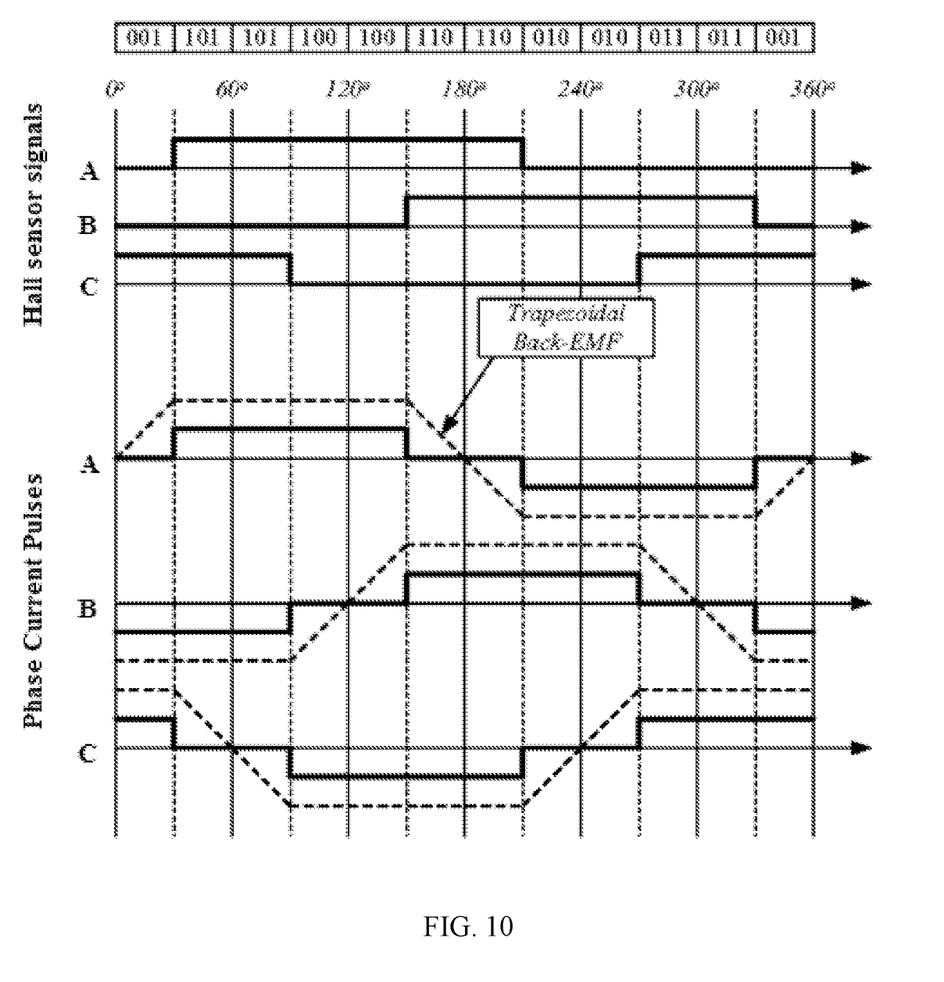
FIG. 10 is an electrical waveform diagram of the Hall-effect sensor signals, the back-EMF signals, and the phase current pulses according to an example of the present application.

FIG. 9 depicts the circuit block diagram for determining the speed threshold S1 and/or the first time threshold T1. It is understood that any additional electronic devices in this circuit block diagram are merely to facilitate finding the threshold value and are not needed for normal operation once the threshold value is determined. In FIG. 9, a position detection device 902 (such as Hall-effect sensor and magnetic encoder) is provided between the motor 56 and the controller 230, and the signals from the position detection device 902 are compared with the signals from the back-EMF detection circuit in order to test the accuracy or correctness of the back-EMF detection. The ideal exemplary waveform of the Hall-effect sensor signals, the back-EMF signals, and the phase current pulses are shown in FIG. 10. For example, when the motor 56 is rotating steadily, integrated Hall-effect sensors placed 120 degrees from each other can produce the following binary codes circularly: 101, 100, 110, 010, 011, 001; the six binary codes correspond to six relative rotational positions (60°, 120°, 180°, 240°, 300°, 360°) of the rotor, and correspond to six energized phase sequences (AB, AC, BC, BA, CA, CB). In this example, if the Hall-effect sensor signal is 101, then the rotor position is at 60° and phase sequence AB is energized. Meanwhile, the back-EMF generated by each phase of windings is a trapezoidal waveform, and the back-EMF waveform of each phase shows two zero-crossing events in each cycle. For example, when phase sequence AB is energized, phase C is non-energized, thus a zero-crossing event happens at phase C during this period, and in this example, the back-EMF of phase C drops from positive to negative. In other words, a zero-crossing event (in this example, dropping from positive to negative) happening at phase C indicates that phase sequence AB is energized. The direction of zero-crossing (from positive to negative or from negative to positive) depends on the direction of the current. Although the current signal is a square wave whereas the back-EMF signal is a trapezoidal wave, the overall variation trend of the phase back-EMF matches the overall variation trend of the phase current.

In implementation, the user starts the motor until the motor reaches a nominal speed and then stops the motor. Suppose the speed of the brushless motor gradually decreases with a gradient of 50 rpm once the controller 230 receives a power-off signal. In the beginning, the signals from the back-EMF detection circuit should still match the signals from the position detection device 902 because the rotational speed of the motor 56 is still relatively fast. Later when the position detection device 902 detects the energized phase sequence as AB, whereas the back-EMF zero-crossing detection circuit points to some non-AB phase sequence, or the zero-crossing event is not even detectable, it is indicated that at this moment, the rotor position can no longer be correctly derived from the back-EMF method. The rotational speed of the motor at this moment is the value of the speed threshold S1; and the time elapsed from the detection of the power-off signal to this moment is the value of the first time threshold T1. In an example, the motor speed detection module 239 or the timing module 237 may be implemented differently in order to calculate the speed threshold value or the time threshold value. For example, the motor speed detection module may receive input from the position detection device 902 instead of the back-EMF detection circuit 57 in order to get more accurate speed values. In actual operation, taking environmental factors and measurement errors, etc. into account, multiple tests can be carried out to determine the threshold values. It is noted that, depending on the specific example of the control method of the present disclosure, the controller 230 may only need to obtain and record either the speed threshold or the time threshold. For example, if the controller 230 adopts the control method using the time interval from the detection of the last power-off signal to the detection of the current power-on signal as the judgment basis as shown in FIG. 5, the controller 230 obtains and records the value of the first time threshold T1; if the controller 230 adopts the control method using the rotational speed of the motor 56 as the judgment basis as shown in FIG. 7, the controller 230 obtains and records the value of the speed threshold S1.

The value of the first time threshold T1 may also be obtained by calculation. One calculation method is based on the speed threshold and the no-load current. The no-load current is the current drawn by the motor 56 at rated voltage at a nominal speed without any load connected to the rotating shaft. For the purpose of deriving the value of the first time threshold, a current detection circuit may be temporarily attached to measure the current when the motor 56 rotates at a nominal speed with no load. The first time threshold T1 can be calculated with function T1=f (I, S1), wherein T1 is the first time threshold; I is the no-load current; and S1 is the speed threshold. Optionally, the first time threshold can also be determined from the moment of inertia of the motor 56. The moment of inertia is a physical property of a motor that mainly depends on the mass distribution with respect to the axis of rotation of the motor 56. With the same amount of torque, a brushless motor with a large moment of inertia requires a longer time to reach a certain speed than a brushless motor with a small moment of inertia. Therefore, the moment of inertia of a motor decides the time the motor 56 needs to reach the speed threshold S1. Thus, the first time threshold T1 can be calculated with function T1=f (MI), wherein T1 is the first time threshold, and MI is the moment of inertia of the motor 56. The derivation of the moment of inertia of a motor is beyond the scope of this closure and is not discussed herein.

The second time threshold T2 is the time interval that allows the motor 56 to coast to a stop from the power-off signal. The second time threshold T2 can be simply obtained by operational experimentations without tampering with the power tool and the value may be the maximum across several experimentation results for reliability. If the power tool has multiple speed settings and the controller adopts the control method using the time interval as the judgment basis, the controller may need to acquire multiple sets of first time threshold and second time threshold. Each set of first time threshold and second time threshold corresponds to the time thresholds under a specific speed setting. For example, if the power tool has a high speed setting and a low speed setting, two sets of time thresholds needs to be obtained. Because it takes longer time for a motor to slow down to a certain level from a higher speed than from a lower speed, the first time threshold for the high speed setting may be greater than the first time threshold for the low speed setting. Similarly, the second time threshold for the high speed setting may be greater than the second time threshold for the low speed setting.

Although this disclosure uses sensorless brushless motor and back-EMF zero-crossing technique as an example to facilitate illustration, the concept of performing certain operation to allow the motor to enter another state more quickly in order to deploy techniques workable in that state can be applied in many other situations. While the disclosure has been described in the specification and illustrated in the drawings with reference to a particular example, it will be understood by those skilled in the art that various changes may be made and equivalents may be substituted for elements thereof without departing from the scope of the disclosure as defined in the claims.

Moreover, many modifications may be made to adapt a particular situation or material to the teachings of the disclosure without departing from the essential scope thereof. Therefore, it is intended that the disclosure not be limited to the particular example illustrated by the drawings and described in the specification as the best mode presently contemplated for carrying out this disclosure, but that the disclosure will include any examples falling within the foregoing description and the appended claims.

What is claimed is:

1. A power tool comprising:
a housing;
a brushless motor disposed inside the housing;
a power supply device configured to supply power to the brushless motor;
a power switch circuit disposed between the power supply device and the brushless motor; and
a controller comprising a switch signal detection module configured to detect power-on signals and power-off signals and a timing module configured to measure a time interval from a detection of a last power-off signal to a detection of a current power-on signal;
wherein the controller is configured to control a switching operation of the power switch circuit to regulate power being supplied from the power supply device to the brushless motor and configured to, upon a detection of a power-on signal, receive a time signal indicative of the time interval from the detection of the last power-off signal to the detection of the current power-on signal from the timing module, determine whether the time interval is greater than or equal to a first time threshold and less than a second time threshold, and brake the brushless motor before start-up if the time interval is greater than or equal to the first time threshold and less than the second time threshold.

2. The power tool of claim 1, wherein the controller further comprises a rotor position calculation module coupled to a back electromotive force detection circuit for detecting a rotor position of the brushless motor.

3. The power tool of claim 2, wherein the first time threshold is substantially equal to a time interval from the detection of the power-off signal to a point that the rotor position calculation module fails to correctly detect the rotor position of the brushless motor through the back electromotive force detection circuit.

4. The power tool of claim 1, wherein the second time threshold is greater than or equal to a time interval that allows the brushless motor to coast to a stop from the detection of the power-off signal.

5. The power tool of claim 1, wherein the controller is further configured to start the brushless motor directly if the time interval is less than the first time threshold or greater than or equal to the second time threshold.

6. The power tool of claim 1, wherein the power tool is a hand-held power tool configured to frequently start and stop in some operation scenarios.

7. The power tool of claim 1, wherein the power tool is selected from a group of a polisher, an electric router, an angle grinder, a reciprocating saw, a drill, and a sander.

8. The power tool of claim 1, further comprising an actuator operable by a user, wherein the user operates the actuator to generate the power-on signal and the power-off signal.

9. The power tool of claim 1, wherein the controller is configured to generate the power-off signal under motor fault conditions or tool fault conditions.

10. A power tool comprising:
a housing;
a sensorless brushless motor disposed inside the housing; and
a controller coupled to a back electromotive force detection circuit for detecting a rotor position of the motor;
wherein the controller is configured to detect a power-on signal and upon detecting the power-on signal receive a speed signal indicative of a rotational speed of the motor and configured to determine whether the rotational speed of the motor is greater than zero and less than or equal to a predetermined speed threshold and brake the motor before start-up if the rotational speed of the motor is greater than zero and less than or equal to the predetermined speed threshold, and
wherein the predetermined speed threshold is substantially equal to a rotational speed at which the controller fails to correctly detect the rotor position of the motor through the back electromotive force detection circuit.

11. The power tool of claim 10, wherein the controller is further configured to start the motor directly if the rotational speed of the motor is zero or greater than the predetermined speed threshold.

12. The power tool of claim 10, further comprising an actuator operable by a user, wherein the user operates the actuator to generate the power-on signal.

13. The power tool of claim 10, wherein the power tool is selected from a group of a polisher, an electric router, an angle grinder, a reciprocating saw, a drill, and a sander.

14. A method for controlling a power tool having a motor, the method comprising:
- detecting a power-off signal and a power-on signal;
- measuring a time interval from a detection of a last power-off signal to a detection of a current power-on signal;
- determining whether the time interval is greater than or equal to a first time threshold and less than a second time threshold; and
- braking the motor before start-up if the time interval is greater than or equal to the first time threshold and less than the second time threshold.

15. The method of claim 14, wherein the first time threshold is substantially equal to a time interval from the detection of the power-off signal to a point that a back electromotive force approach fails to correctly detect a rotor position of the motor.

16. The method of claim 14, wherein the second time threshold is greater than or equal to a time interval that allows the motor to coast to a stop from the detection of the power-off signal.

17. The method of claim 14, further comprising starting the power tool directly if the time interval is less than the first time threshold or greater than or equal to the second time threshold.

* * * * *